United States Patent
Ro et al.

(10) Patent No.: US 10,254,604 B2
(45) Date of Patent: Apr. 9, 2019

(54) LIQUID CRYSTAL DISPLAY DEVICE

(71) Applicant: SAMSUNG DISPLAY CO., LTD., Yongin, Gyeonggi-Do (KR)

(72) Inventors: Sungin Ro, Hwaseong-si (KR); Donggun Oh, Osan-si (KR)

(73) Assignee: Samsung Display Co., Ltd. (KR)

( * ) Notice: Subject to any disclaimer, the term of this patent is extended or adjusted under 35 U.S.C. 154(b) by 112 days.

(21) Appl. No.: 14/860,038

(22) Filed: Sep. 21, 2015

(65) Prior Publication Data

US 2016/0282666 A1 Sep. 29, 2016

(30) Foreign Application Priority Data

Mar. 24, 2015 (KR) .................. 10-2015-0040755

(51) Int. Cl.
  *G02F 1/1343* (2006.01)
  *G02F 1/1345* (2006.01)
  *G02F 1/1362* (2006.01)

(52) U.S. Cl.
  CPC .... *G02F 1/13454* (2013.01); *G02F 1/136209* (2013.01); *G02F 1/136286* (2013.01); *G02F 2001/134372* (2013.01); *G02F 2001/136222* (2013.01)

(58) Field of Classification Search
  CPC ......... G02F 1/134363; G02F 1/133512; G02F 1/134309
  USPC .......................................................... 349/43
  See application file for complete search history.

(56) References Cited

U.S. PATENT DOCUMENTS

| 6,225,966 B1* | 5/2001 | Ohtani ............... G02F 1/136213 257/E29.147 |
| 6,255,131 B1* | 7/2001 | Mori ................. G02F 1/136213 257/E21.412 |
| 2001/0012079 A1* | 8/2001 | Yamamoto ........ G02F 1/133514 349/106 |
| 2001/0026344 A1* | 10/2001 | Sakamoto ......... G02F 1/134363 349/141 |
| 2002/0101557 A1* | 8/2002 | Ono .................. G02F 1/134363 349/143 |
| 2002/0140891 A1* | 10/2002 | Tomioka ........... G02F 1/134363 349/141 |

(Continued)

FOREIGN PATENT DOCUMENTS

| KR | 10-2009-0092659 A | 9/2009 |
| KR | 10-2013-0061707 A | 6/2013 |
| KR | 10-2013-0091701 A | 8/2013 |

*Primary Examiner* — Christopher Raabe
(74) *Attorney, Agent, or Firm* — Innovation Counsel LLP

(57) ABSTRACT

A liquid crystal display device includes: a lower substrate including a display unit and a non-display unit; an upper substrate opposing the lower substrate; a gate line and a data line disposed in the display unit of the lower substrate; a light shielding layer defining a pixel region of the lower substrate; a pixel electrode disposed in the pixel region of the lower substrate; a pixel transistor disposed in the display unit of the lower substrate and connected to the gate line, the data line, and the pixel electrode; a driving transistor disposed in the non-display unit of the lower substrate; a first protection layer disposed on the pixel transistor and the driving transistor; a shielding layer disposed on the first protection layer, the shielding layer overlapping at least one of the pixel transistor and the driving transistor; and a second protection layer disposed on the shielding layer.

21 Claims, 9 Drawing Sheets

(56) References Cited

U.S. PATENT DOCUMENTS

| | | | | |
|---|---|---|---|---|
| 2004/0051100 | A1* | 3/2004 | Yamazaki | G02F 1/134363 257/59 |
| 2007/0029644 | A1* | 2/2007 | Nakagawa | G02F 1/1345 257/659 |
| 2008/0284962 | A1* | 11/2008 | Horiguchi | G02F 1/134363 349/139 |
| 2009/0176073 | A1 | 7/2009 | Ohnuma | |
| 2010/0244029 | A1 | 9/2010 | Yamazaki et al. | |
| 2012/0300152 | A1* | 11/2012 | Anjo | G02F 1/134363 349/43 |
| 2013/0314636 | A1* | 11/2013 | Chen | G02F 1/13624 349/43 |
| 2014/0071387 | A1* | 3/2014 | Sakai | G02F 1/136209 349/110 |
| 2015/0022550 | A1* | 1/2015 | Katpally Reddy | G06T 19/006 345/632 |

* cited by examiner

LIQUID CRYSTAL DISPLAY DEVICE

CROSS-REFERENCE TO RELATED APPLICATION

This application claims the priority to and all the benefits accruing under 35 U.S.C. § 119 of Korean Patent Application No. 10-2015-0040755, filed on Mar. 24, 2015, with the Korean Intellectual Property Office (KIPO), the disclosure of which is incorporated herein in its entirety by reference.

BACKGROUND

1. Field

Embodiments of the present disclosure relate to a display device, and more particularly, to a liquid crystal display ("LCD") device capable of reducing a thickness of a display panel.

2. Description of the Related Art

A liquid crystal display ("LCD") device is a type of flat panel display ("FPD") devices that have gained wide acceptance recently. An LCD device includes two substrates having electrodes formed on the two substrates and a liquid crystal layer interposed between the two substrates. In such an LCD device, liquid crystal molecules of the liquid crystal layer are rearranged by voltages that are applied to the two electrodes, and thereby adjusting the amount of transmitted light and displaying an image on the LCD device.

It is to be understood that the background of the present disclosure is intended to provide useful background for understanding the technology and as such disclosed herein, the technology background section may include ideas, concepts, or recognitions that are not part of what was known or appreciated by those skilled in the pertinent art prior to a corresponding effective filing date of subject matter disclosed herein.

SUMMARY

Aspects of embodiments of the present disclosure are directed to a liquid crystal display ("LCD") device capable of reducing a thickness of a display panel. According to an exemplary embodiment, a liquid crystal display device includes: a lower substrate including a display unit and a non-display unit; an upper substrate opposing the lower substrate; a liquid crystal layer interposed between the lower substrate and the upper substrate; a gate line and a data line disposed in the display unit of the lower substrate; a light shielding layer defining a pixel region of the lower substrate; a pixel electrode disposed in the pixel region of the lower substrate; a pixel transistor disposed in the display unit of the lower substrate and connected to the gate line, the data line, and the pixel electrode; a driving transistor disposed in the non-display unit of the lower substrate; a first protection layer disposed on the pixel transistor and the driving transistor; a shielding layer disposed on the first protection layer, the shielding layer overlapping at least one of the pixel transistor and the driving transistor and in an electrically floating state; and a second protection layer disposed on the shielding layer.

The shielding layer may overlap a channel of one of the pixel transistor and the driving transistor. The shielding layer may have a greater size than a size of a channel of one of the pixel transistor and the driving transistor. The shielding layer may have a greater size than a size of a semiconductor layer of one of the pixel transistor and the driving transistor.

The shielding layer may include a first shielding layer overlapping a channel of the pixel transistor and a second shielding layer overlapping a channel of the driving transistor. The first shielding layer may have a greater size than a size of the channel of the pixel transistor. The first shielding layer may have a greater size than a size of a semiconductor layer of the pixel transistor. The second shielding layer may have a greater size than a size of the channel of the driving transistor. The second shielding layer may have a greater size than a size of a semiconductor layer of the driving transistor. The first shielding layer may be separated from the second shielding layer.

The shielding layer may be in direct contact with the first protection layer.

The first protection layer and the second protection layer may be formed of an inorganic insulating material.

The liquid crystal display device may further include a common electrode interposed between the first protection layer and the second protection layer to overlap the pixel electrode.

The common electrode may be disposed on a same layer as a layer on which the shielding layer is disposed.

The liquid crystal display device may further include a color filter interposed between the first protection layer and the common electrode to overlap the pixel electrode.

The liquid crystal display device may further include a color filter disposed on the upper substrate to overlap the pixel electrode.

The light shielding layer may be disposed on the second protection layer and cover an entire surface of the lower substrate, aside from the pixel region.

The light shielding layer may be disposed on an entire surface of the upper substrate, aside from the pixel region.

The pixel electrode may include: a stem electrode; and a plurality of branch electrodes branching off from the stem electrode.

The liquid crystal display device may further include a connection electrode extending from the stem electrode to outwardly of the pixel region and connected to the pixel transistor.

The foregoing is illustrative only and is not intended to be in any way limiting. In addition to the illustrative aspects, embodiments, and features described herein, further aspects, embodiments, and features will become apparent by reference to the drawings and the following detailed description.

BRIEF DESCRIPTION OF THE DRAWINGS

The above and other features and aspects of the present disclosure will be more clearly understood from the following detailed description taken in conjunction with the accompanying drawings, in which.

DETAILED DESCRIPTION

Figure 1:
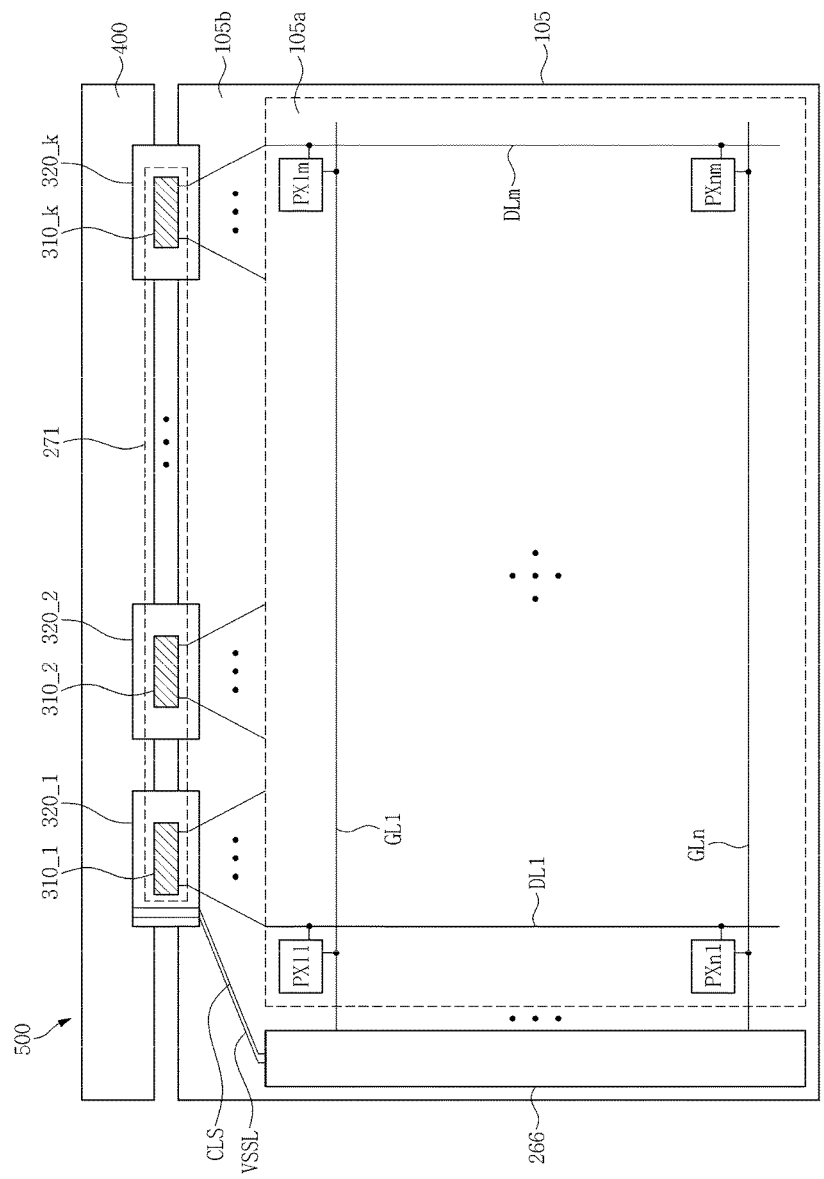
FIG. 1 is a plan view illustrating a liquid crystal display ("LCD") device, according to an exemplary embodiment.

Advantages and features of the present disclosure and methods for achieving them will be made clear from exemplary embodiments described below in detail with reference to the accompanying drawings. The present disclosure may, however, be embodied in many different forms and should not be construed as being limited to the exemplary embodiments set forth herein. Rather, these exemplary embodiments are provided so that this disclosure will be thorough and complete, and will fully convey the scope of the present disclosure to those skilled in the art. Therefore, well-known constituent elements, operations and techniques are not described in detail in the exemplary embodiments in order to prevent the present disclosure from being obscurely interpreted. Like reference numerals refer to like elements throughout the specification.

In the drawings, thicknesses of a plurality of layers and areas may be illustrated in an enlarged manner for clarity and ease of description thereof. When a layer, an area, or a plate is referred to as being "on" another layer, area, or plate, it may be directly on the other layer, area, or plate, or one or more intervening layers, areas, or plates may be present therebetween. Conversely, when a layer, an area, or a plate is referred to as being "directly on" another layer, area, or plate, intervening layers, areas, or plates may be absent therebetween. Further when a layer, an area, or a plate is referred to as being "below" another layer, area, or plate, it may be directly below the other layer, area, or plate, or one or more intervening layers, areas, or plates may be present therebetween. Conversely, when a layer, an area, or a plate is referred to as being "directly below" another layer, area, or plate, intervening layers, areas, or plates may be absent therebetween.

The spatially relative terms "below," "beneath," "lower," "above," "upper," and the like, may be used herein for ease of description to describe the relations between one element or component and another element or component as illustrated in the drawings. It will be understood that the spatially relative terms are intended to encompass different orientations of a device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in another direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is a plan view illustrating a liquid crystal display ("LCD") device 500, according to an exemplary embodiment. The LCD device 500 includes a display panel 105, an upper panel 200 of FIG. 3, a gate driving unit 266, a data driving unit 271, and a driving circuit board 400. The display panel 105 includes a display unit 105a in which a plurality of pixels PX11-PXnm arranged in a matrix form are disposed, a non-display unit 105b surrounding the display unit 105a, a plurality of gate lines GL1-GLn, a plurality of data lines DL1-DLm intersecting the plurality of gate lines GL1-GLn, a control signal wiring unit CLS, and an off-voltage line VSSL.

The gate lines GL1-GLn are connected to the gate driving unit 266. The gate lines GL1-GLn receive an input of gate signals that are sequentially generated from the gate driving unit 266. The data lines DL1-DLm are connected to the data driving unit 271. The data lines DL1-DLm receive an input of data voltages in an analog form from the data driving unit 271.

The pixels PX11-PXnm are positioned in an area in which the gate lines GL1-GLn and the data lines DL1-DLm intersect one another. The pixels PX11-PXnm are arranged in "m" number of columns and "n" number of rows, the columns and rows intersecting one another. "m" and "n" is an integer greater than zero. The pixels PX11-PXnm are connected to the gate lines GL1-GLn and the data lines DL1-DLm, respectively, in a corresponding manner. The pixel receives the data voltage supplied thereto from the data line, in response to the gate signal from the gate line. The pixel displays a gray scale corresponding to the data voltage.

The control signal wiring unit CLS is connected to the gate driving unit 266 through a leftmost flexible circuit board 320_1. The control signal wiring unit CLS receives control signals from a timing controller (not illustrated) that is mounted on the driving circuit board 400. The control signals are supplied to the gate driving unit 266 through the control signal wiring unit CLS. The off-voltage line VSSL is connected to the gate driving unit 266 through the leftmost flexible circuit board 320_1. The off-voltage line VSSL receives an off-voltage from a power generator (not illustrated) that is mounted on the driving circuit board 400. The off-voltage may be supplied to the gate driving unit 266 through the off-voltage line VSSL.

The gate driving unit 266 is disposed in a portion of the non-display unit 105b adjacent to a side of the display unit 105a. In detail, the gate driving unit 266 is mounted on a portion of the non-display unit 105b adjacent to a left side of the display unit 105a. The gate driving unit 266 sequentially generates the gate signals using the control signals supplied through the control signal wiring unit CLS, and supplies the generated gate signals to the gate lines GL1-GLn. The gate lines may be sequentially driven from an uppermost gate line to a lowermost gate line.

The data driving unit 271 receives data signals from the timing controller, and generates analog data voltages corresponding to the supplied data signals. The data driving unit 271 supplies data voltages to the pixels PX11-PXnm through the data lines DL1-DLm. The data driving unit 271 includes a plurality of source driving chips 310_1-310_k. "k" is an integer greater than zero and less than "m". The source driving chips 310_1-310_k are mounted on corresponding flexible circuit boards 320_1-320_k. The source driving chips 310_1-310_k are connected between the driving circuit board 400 and a portion of the non-display unit 105b adjacent to an upper portion of the display unit 105a. Meanwhile, the source driving chips 310_1-310_k are mounted on the portion of the non-display unit 105b adjacent to the upper portion of the display unit 105a, in a chip-on-glass (COG) manner.

Figure 2:
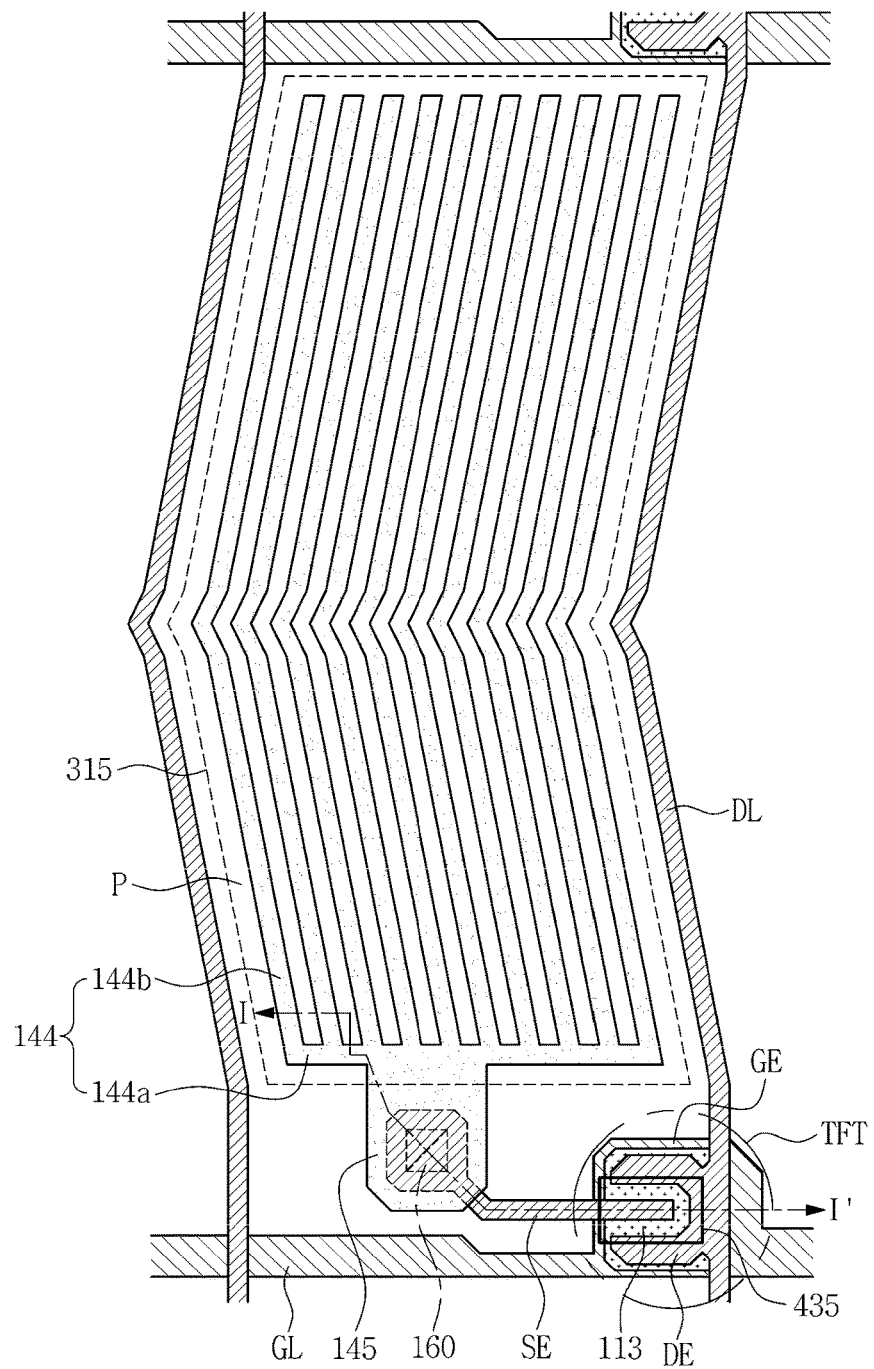
FIG. 2 is a configuration view of a pixel illustrated in FIG. 1.
Figure 3:
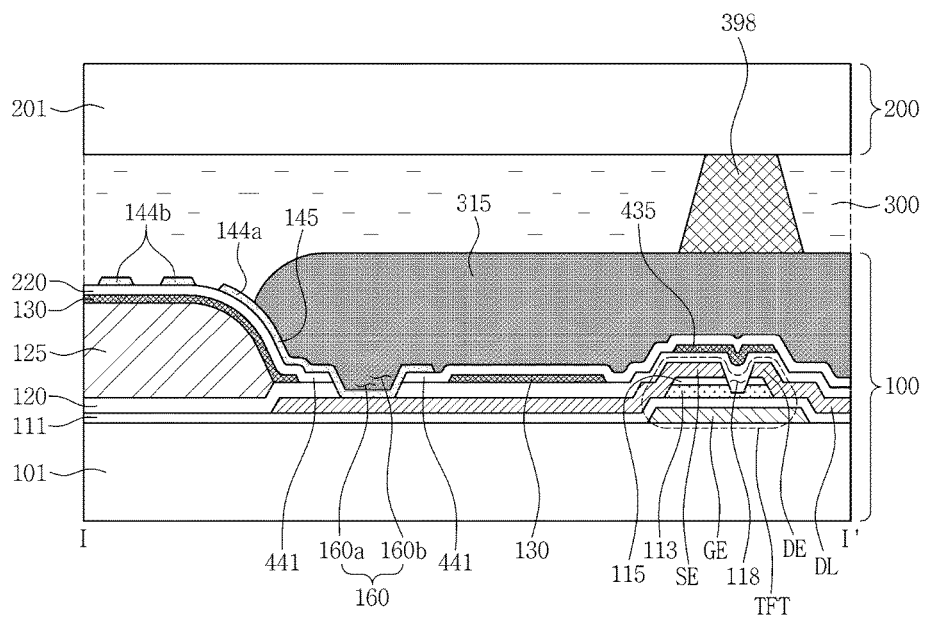
FIG. 3 is a cross-sectional view taken along line I-I' of FIG. 2.

FIG. 2 is a configuration view of a pixel illustrated in FIG. 1; and FIG. 3 is a cross-sectional view taken along line I-I' of FIG. 2.

Referring to FIGS. 2 and 3, the display panel 105 includes a lower panel 100 and an upper panel 200 opposing one other, and a liquid crystal layer 300 interposed therebetween. The lower panel 100, as illustrated in FIGS. 2 and 3, includes a lower substrate 101, a gate line GL, a gate insulating layer 111, a semiconductor layer 113, an ohmic contact layer 115, a source electrode SE, a drain electrode DE, a pixel transistor TFT, a data line DL, a first protection layer 120, a color filter 125, a common electrode 130, a second protection layer 220, a pixel electrode 144, and a black matrix 315. The lower substrate 101 may be an insulating substrate including a transparent material, such as glass or plastics.

As illustrated in FIGS. 2 and 3, the gate line GL is disposed on the lower substrate 101. The gate line GL includes a line portion 411 and an electrode portion GE (hereinafter, also referred to as a "gate electrode") that have different widths from one another. For example, the gate electrode GE may have a width greater than that of the line portion 411. The line portion 411 and the electrode portion GE may be integrally formed.

Although not illustrated, the gate line GL may have a connection portion, for example, an end portion of the gate line GL that is greater than another portion thereof in size and is connected to another layer or the gate driving unit 266. The gate line GL may include at least one of the following metals: aluminum (Al) or an Al-based metal such as an Al alloy, silver (Ag) or a Ag-based metal such as a Ag alloy, copper (Cu) or a Cu-based metal such as a Cu alloy, and/or molybdenum (Mo) or a Mo-based metal such as a Mo alloy. Alternatively, the gate line GL may include one of the following materials: chromium (Cr), tantalum (Ta), and titanium (Ti). The gate line GL may have a multilayer structure including at least two conductive layers that have different physical properties.

The gate insulating layer 111 is disposed on the gate line GL. In one embodiment, the gate insulating layer 111 is formed over an entire surface of the lower substrate 101 including the gate line GL. The gate insulating layer 111 may be formed of silicon nitride ($SiN_x$), silicon oxide ($SiO_x$), or the like. The gate insulating layer 111 may have a multilayer structure including at least two insulating layers that have different physical properties.

The semiconductor layer 113 is disposed on the gate insulating layer 111. In one embodiment, the semiconductor layer 113 overlaps the gate electrode GE. The semiconductor layer 113 may be formed of amorphous silicon, polycrystalline silicon, indium gallium zinc oxide (IGZO), or the like.

The ohmic contact layer 115 is disposed on the semiconductor layer 113. The ohmic contact layer 115 may include silicide or hydrogenated amorphous silicon doped with n-type impurities at high concentration such as phosphorus. The ohmic contact layer 115 may be disposed on the semiconductor layer 113 in pairs.

The drain electrode DE and the source electrode SE are disposed on the ohmic contact layer 115. The drain electrode DE branches off from the data line DL, and as illustrated in FIG. 1, may have a shape protruding toward the gate electrode GE. In one embodiment, the drain electrode DE has an inverted C-shape surrounding a portion of the source electrode SE. At least a portion of the drain electrode DE overlaps the semiconductor layer 113 and the gate electrode GE. In other embodiments, the drain electrode DE may have one of a C-shape, a U-shape, and an inverted U-shape, in lieu of the inverted C-shape.

More particularly, the drain electrode DE may be formed of a refractory metal, such as Mo, Cr, Ta, or Ti, or an alloy thereof. The drain electrode DE may have a multilayer structure including a refractory metal layer and a low-resistance conductive layer. Examples of the multilayer structure include, but are not limited to, a double-layer structure including a Cr or Mo (or Mo alloy) lower layer and an Al (or Al alloy) upper layer; and a triple-layer structure including a Mo (or Mo alloy) lower layer, an Al (or Al alloy) intermediate layer, and a Mo (or Mo alloy) upper layer. The drain electrode DE may be formed of various metals or conductive materials, in addition to, or instead of, the aforementioned materials.

One side of the source electrode SE is connected to the pixel electrode 144 through the connection electrode 145. One side of the source electrode SE overlaps the connection electrode 145, and the other side of the source electrode SE overlaps the semiconductor layer 113 and the gate electrode GE.

The source electrode SE may also include the same material and may have the same structure (multilayer structure) as those of the aforementioned drain electrode DE. In other words, the source electrode SE and the drain electrode DE may be simultaneously formed in the same process.

The gate electrode GE, the source electrode SE, and the drain electrode DE form the pixel transistor TFT, along with the semiconductor layer 113. In one embodiment, a channel of the pixel transistor TFT is formed on a portion of the semiconductor layer 113 between the source electrode SE and the drain electrode DE. The portion of the semiconductor layer 113 corresponding to the channel may have a thinner thickness than a thickness of another portion of the semiconductor layer 113.

The data line DL transmits an image data signal. The data line DL may be formed on the gate insulating layer 111. Although not illustrated, the data line DL may have a connection portion, for example, an end portion of the data line DL that has a greater area than that of another portion thereof and is connected to another layer or an external driving circuit.

The data line DL intersects the gate line GL. The data line DL may have a zigzag shape. In one embodiment, to increase a level of transmittance of the LCD device 500, a protrusion portion of the data line DL having a wedge shape is disposed in a bent portion of the data line DL. The data line DL may be divided into the protrusion portion and line portions disposed at both sides of the protrusion portion, respectively, and a contained angle of the protrusion portion may be less than a contained angle between the line portions.

The data line DL may include the same material and may have the same structure (multilayer structure) as those of the aforementioned drain electrode DE. In other words, the data line DL and the drain electrode DE may be simultaneously formed in the same process.

The first protection layer 120 is disposed on the data line DL, the drain electrode DE, and the source electrode SE. In one embodiment, the first protection layer 120 is formed over the entire surface of the lower substrate 101 including the data line DL, the drain electrode DE, and the source electrode SE.

The first protection layer 120 may be formed of an inorganic insulating material such as $SiN_x$ or $SiO_x$. The inorganic insulating material may have photosensitivity and a dielectric constant of about 4.0.

The first protection layer 120 may also have a multilayer structure including an organic layer and an inorganic layer. The multilayer structure of the first protection layer 120 has a good insulating property, and a damage to an exposed portion of the semiconductor layer 113 may be significantly reduced.

The first protection layer 120 may have a thickness of greater than or equal to about 5000 angstroms (Å), and more particularly, in a range of about 6000 Å to about 8000 Å. The first protection layer 120 has a lower contact hole 160a penetrating through a portion thereof, and a portion of the source electrode SE is exposed through the lower contact hole 160a.

The color filter 125 is disposed on the first protection layer 120. For example, the color filter 125 is disposed on a portion of the first protection layer 120 corresponding to a pixel region P of the lower substrate 101. The color filter 125 may include a red color filter, a green color filter, and a blue color filter.

The common electrode 130 receives a common voltage that is externally supplied. The common electrode 130 is disposed on the first protection layer 120 and the color filter 125. The common electrode 130 may be formed over an entire surface of the display unit 105a of the lower substrate 101. A description pertaining to the common electrode 130 will further be described with reference to FIG. 4 hereinbelow.

Figure 4:
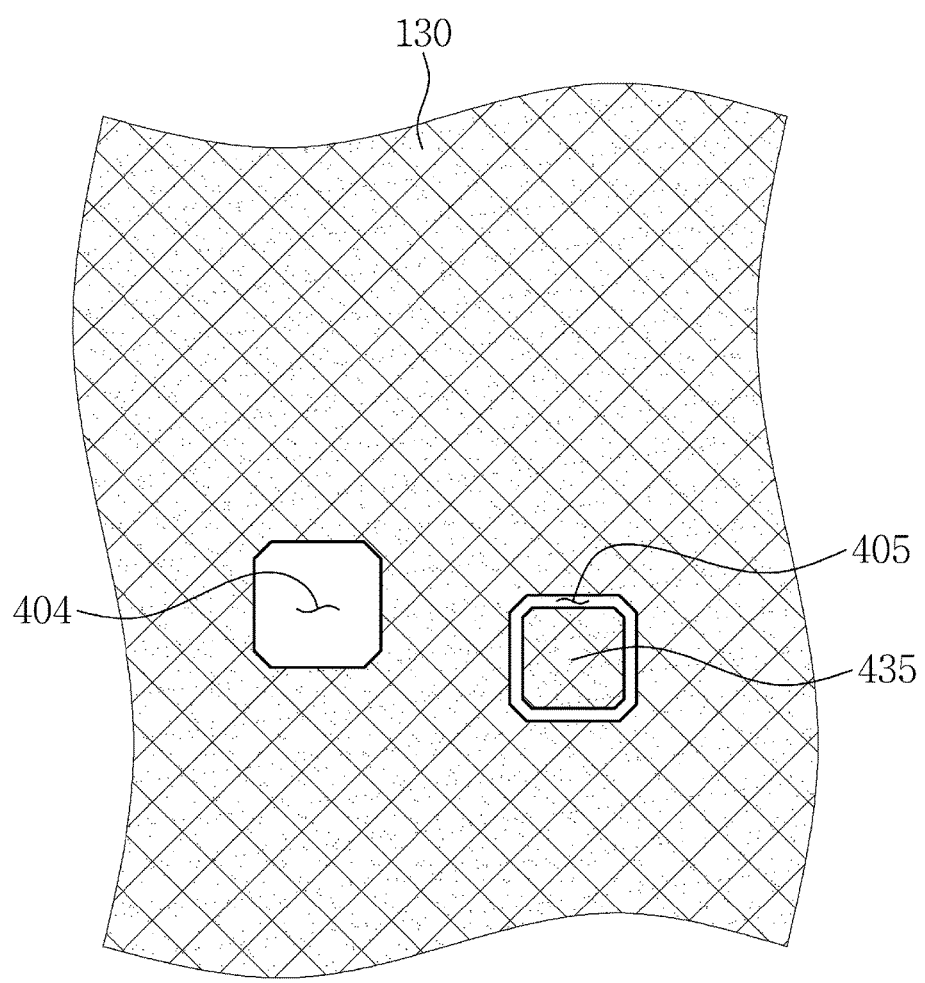
FIG. 4 is a plan view illustrating a common electrode of FIG. 3.

FIG. 4 is a plan view illustrating the common electrode 130 of FIG. 3, and only a portion of the common electrode 130 is illustrated in FIG. 4. The common electrode 130 has two apertures 404 and 405 that penetrate portions of the common electrode 130, respectively. One of the apertures 404 and 405, for example, the aperture 404 is disposed directly above the lower contact hole 160a. The aperture 404 may have a sufficiently large size to surround the lower contact hole 160a and an upper contact hole 160b to be described further below. A portion of the source electrode SE is exposed through the aperture 404 and the lower contact hole 160a. The other of the apertures 404 and 405, that is, the aperture 405 serves to separate a shielding layer 435 to be described further below and the common electrode 130.

The common electrode 130 may include a transparent conductive material such as indium tin oxide (ITO) or indium zinc oxide (IZO). In one embodiment, ITO is a polycrystalline or monocrystalline material, and IZO is also a polycrystalline or monocrystalline material.

The shielding layer 435 is disposed on the first protection layer 120. The shielding layer 435 may be in direct contact with the first protection layer 120. In one embodiment, the shielding layer 435 overlaps the pixel transistor TFT, while being on the first protection layer 120. For example, the shielding layer 435 overlaps a channel 118 of the pixel transistor TFT. In one embodiment, the shielding layer 435 may have a size greater than or equal to that of the channel 118 of the pixel transistor TFT. For example, the shielding layer 435 may have a surface area greater than or equal to that of the channel 118 of the pixel transistor TFT. In another embodiment, the shielding layer 435 may have a size greater than or equal to that of the semiconductor layer 113 of the pixel transistor TFT. For example, the shielding layer 435 may have a surface area greater than or equal to that of the semiconductor layer 113 of the pixel transistor TFT The shielding layer 435 may be formed of a material used in the aforementioned common electrode 130. In addition, the shielding layer 435 may be disposed on the same layer as a layer on which the common electrode 130 is disposed. Further, the shielding layer 435 and the common electrode 130 may be simultaneously formed in the same mask process. In one embodiment, as illustrated in FIG. 4, the shielding layer 435 and the common electrode 130 are separated from one another.

The shielding layer 435 may be maintained in an electrically floating state. In other words, any electric signal applied to the shielding layer 435 may be absent. The shielding layer 435 may prevent hydrogen that is generated from the second protection layer 220 to be described further below, from flowing into the channel 118 of the pixel transistor TFT. In other words, since an organic layer is absent between the first protection layer 120 and the second protection layer 220, an excessive amount of hydrogen generated from the second protection layer 220 may pass through the first protection layer 120 to infiltrate into the pixel transistor TFT. In this regard, the shielding layer 435 may prevent such an excessive amount of hydrogen from flowing into the channel 118 of the pixel transistor TFT.

The second protection layer 220 is disposed on the common electrode 130 and the shielding layer 435. The second protection layer 220 may be formed over the entire surface of the lower substrate 101 including the common electrode 130 and the shielding layer 435. The second protection layer 220 may be formed of a material used in the aforementioned first protection layer 120. Since the second protection layer 220 has the upper contact hole 160b penetrating through a portion thereof, the upper contact hole 160b is disposed directly above the aforementioned aperture. Through the aperture, the lower contact hole 160a and the upper contact hole 160b may be connected to one another to form a single source contact hole 160.

The source contact hole 160 may be formed in the following process. For example, subsequently to the common electrode 130 being formed on the first protection layer 120 and the color filter 125, a portion of the common electrode 130 is removed through a photolithography process and an etching process to form the aperture 404. The first protection layer 120 is exposed through the aperture 404. Subsequently, the second protection layer 220 is formed over the entire surface of the lower substrate 101 including the common electrode 130 in which the aperture 404 is formed. In one embodiment, a portion of the second protection layer 220 is brought into contact with a portion of the first protection layer 120 that is exposed through the aperture 404. The portion of the second protection layer 220 and the portion of the first protection layer 120 that are disposed within the aperture 404 are removed together through a photolithography process and an etching process to form the source contact hole 160. In one embodiment, the source contact hole 160 is far smaller than the aperture 404. In this instance, an exposed surface of the common electrode 130 that corresponds to an inner wall of the aperture 404 may be sufficiently covered by the second protection layer 220 to prevent a short-circuit between the common electrode 130 and the pixel electrode 144 that is to be subsequently inserted into the source contact hole 160.

The pixel electrode 144 generates a horizontal electric field, along with the common electrode 130. The pixel electrode 144 is disposed on the second protection layer 220. In detail, the pixel electrode 144 is disposed on a portion of the second protection layer 220 corresponding to the pixel region P of the lower substrate 101. In this instance, the pixel electrode 144 overlaps the common electrode 130.

The pixel electrode 144 includes a stem electrode 144a and a plurality of branch electrodes 144b branching off from the stem electrode 144a. The plurality of branch electrodes 144b are spaced apart from one another at a predetermined interval therebetween.

A horizontal electric field is generated between the branch electrodes 144b and the common electrode 130. The branch electrodes 144b are linear electrodes, and the common electrode is a surface electrode. Each of the branch electrodes 144b extends in a direction substantially the same as that of the data line DL. In one embodiment, each of the branch electrodes 144b may have the same shape as that of a portion of the data line DL. In another embodiment, each of the branch electrodes 144b may have a protrusion portion having a wedge shape. The protrusion portion of each of the branch electrodes 144b may have the same shape as that of the protrusion portion of the data line DL. The branch electrodes 144b may further extend outwardly of the pixel region P.

The pixel electrode 144 may include a transparent conductive material such as ITO or IZO. In one embodiment, ITO may be a polycrystalline or monocrystalline material, and IZO may also be a polycrystalline or monocrystalline material.

The connection electrode 145 connects the pixel electrode 144 and the pixel transistor TFT to one another. The connection electrode 145 may be integrally formed with the pixel electrode 144. The connection electrode 145 extends from the stem electrode 144a of the pixel electrode 144 and is disposed on the drain electrode DE of the pixel transistor TFT. The connection electrode 145 may be connected to the source electrode SE through the source contact hole 160. The connection electrode 145 may include the same material as that included in the aforementioned pixel electrode 144. The connection electrode 145 and the pixel electrode 144 may be integrally formed.

Referring to FIG. 3, a portion 441 of the second protection layer 220 is disposed between the pixel electrode 144 and the exposed surface of the common electrode 130 that corresponds to the inner wall of the aperture 404. A short-circuit caused between the pixel electrode 144 and the common electrode 130 may be prevented.

The black matrix 315 is disposed on the pixel electrode 144, the connection electrode 145, and the second protection layer 220. The black matrix 315 may prevent light emission from an area other than the pixel region P. In other words, the black matrix 315 may prevent light leakage in a non-pixel region. To this end, the black matrix 315 has an aperture defined corresponding to the pixel region P, and covers an entire area in the lower substrate 101 aside from the pixel region P. In detail, a portion of the display unit 105a of the lower substrate 101 aside from the pixel region P and the non-display unit 105b of the lower substrate 101 is covered by the black matrix 315.

Although not illustrated, a lower alignment layer may be disposed on the pixel electrode 144, the connection electrode 145, the second protection layer 220, and the black matrix 315. The lower alignment layer may be a homeotropic layer and may be an alignment layer including a photoreactive material. The lower alignment layer may include one of the following materials: polyamic acid, polysiloxane, and polyimide.

The upper panel 200 includes an upper substrate 201. The upper substrate 201 may be an insulating substrate including a transparent material, such as glass or plastics. Although not illustrated, the upper panel 200 may further include an upper alignment layer. The upper alignment layer may be disposed on the upper substrate 201. The upper alignment layer may include the same material as that included in the aforementioned lower alignment layer. Surfaces of the lower substrate 101 and the upper substrate 201 that face one another are defined as upper surfaces of the corresponding substrates, respectively. Surfaces of the lower substrate 101 and the upper substrate 201 opposite to the upper surfaces thereof are defined as lower surfaces of the corresponding substrates, respectively. An upper polarizer may further be disposed on the lower surface of the lower substrate 101, and a lower polarizer may further be disposed on the lower surface of the upper substrate 201.

A transmission axis of the upper polarizer may be perpendicular to a transmission axis of the lower polarizer, and thus one of the transmission axes and the line portion 411 of the gate line GL may be disposed in parallel to one another. The LCD device 500 may only include one of the upper polarizer and the lower polarizer.

According to one embodiment, the color filter 125 may be disposed on the upper panel 200 rather than on the lower panel 100. In this case, the color filter 125 may be disposed in a pixel region of the upper substrate 201.

The liquid crystal layer 300 may include a nematic liquid crystal material having a positive dielectric anisotropy. Within the liquid crystal layer 300, liquid crystal molecules have a structure in which a major axis of the liquid crystal molecules is parallel to one of the upper panel 200 and the lower panel 100 and a direction of the major axis is twisted into a spiral shape at an angle of 90 degrees from a rubbing direction of the alignment layer of the lower panel 100 to the upper panel 200. Alternatively, the liquid crystal layer 300 may include homeotropic liquid crystal materials, in lieu of the nematic liquid crystal materials.

A column spacer 398 is interposed between the lower panel 100 and the upper panel 200, and may maintain a predetermined cell gap therebetween. The column spacer 398 may be formed of an organic insulating material such as benzocyclobutene (BCB) or photo acryl, or an inorganic insulating material such as $SiN_x$ or $SiO_x$.

The shielding layer 435 is disposed in the gate driving unit 266. In one embodiment, the shielding layer 435 may be disposed in at least one of the aforementioned display unit 105a and the gate driving unit 266 of the non-display unit 105b. Hereinafter, a description pertaining to the shielding layer 435 disposed in the gate driving unit 266 will further be provided with reference to FIGS. 5 through 9.

Figure 5:
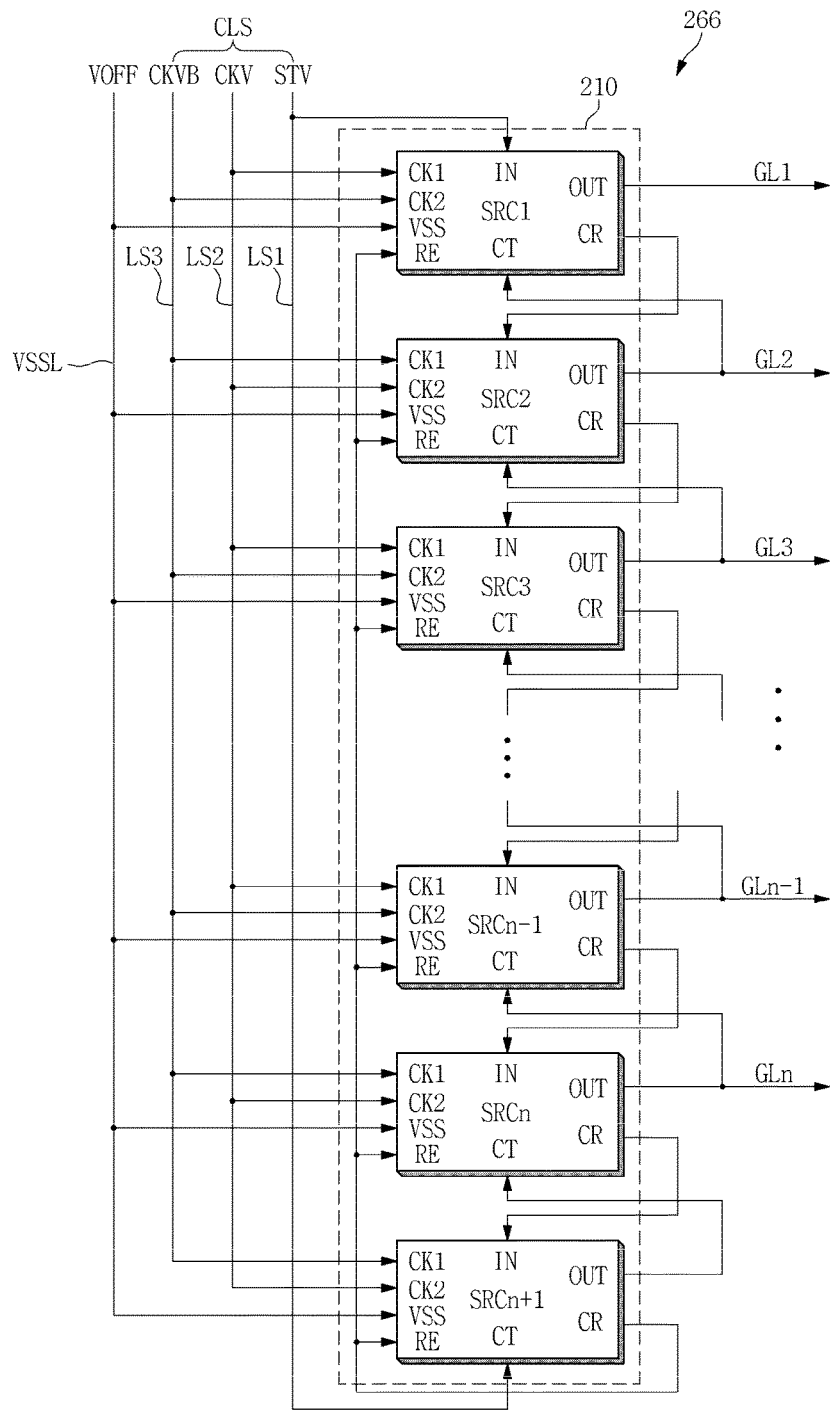
FIG. 5 is a block configuration view of a gate driving unit illustrated in FIG. 1.

FIG. 5 is a block configuration view of the gate driving unit 266 illustrated in FIG. 1. The gate driving unit 266 includes a shift register 210. The shift register 210 includes first through (n+1)-th stages SRC1-SRCn+1 that are dependently connected. Each of the first through n-th stages SRC1-SRCn is referred to as a driving stage, and the (n+1)-th stage SRCn+1 is referred to as a dummy stage. The first through n-th stages SRC1-SRCn are connected to first through n-th gate lines GL1, . . . , GLn. The first through n-th stages SRC1-SRCn sequentially output first through n-th gate signals to the first through n-th gate lines GL1, . . . , GLn.

Each of the first through (n+1)-th stages SRC1-SRCn+1 includes a first clock terminal CK1, a second clock terminal CK2, an off-voltage terminal VSS, a reset terminal RE, a control terminal CT, a carry terminal CR, an output terminal OUT, and an input terminal N. The first clock terminal CK1 and the second clock terminal CK2 receive an input of clock signals having opposite phases. In one embodiment, a first clock signal CKV is input to the first clock terminal CK1 of each of odd-numbered stages SRC1, SRC3, . . . , SRCn−1, and a second clock signal CKVB is input to the second clock terminal CK2 of each of the odd-numbered stages SRC1, SRC3, . . . , SRCn−1. The second clock signal CKVB has a phase shifted by 180 degrees with respect to a phase of the first clock signal CKV. In another embodiment, the second clock signal CKVB is input to the first clock terminal CK1 of each of even-numbered stages SRC2, SRC4, . . . , SRCn, and the first clock signal CKV is input to the second clock terminal CK2 of each of the even-numbered stages SRC2, SRC4, . . . , SRCn.

The input terminal IN of the first stage SRC1 and the control terminal CT of the dummy stage SRCn+1 receive an input of a vertical start signal STV. Each of the input terminals IN of the second through (n+1)-th stages SRC2-SRCn+1 receives an input of a carry signal that is output from the carry terminal CR of each previous stage. The carry signal output from the carry terminal CR serves to drive a subsequent stage. Each of the control terminals CT of the first through n-th stages SRC1-SRCn receives an input of a gate signal that is output from the output terminal OUT of each subsequent stage. An off-voltage VOFF (or a ground voltage) is input to the off-voltage terminals VSS of the first through (n+1)-th stages SRC1-SRCn+1. The reset terminals RE of the first through (n+1)-th stages SRC1-SRCn+1 receive a carry signal as a common signal, the carry signal being output from the carry terminal CR of the dummy stage SRCn+1.

The first and second clock signals CKV and CKVB may be a gate-on-voltage capable of driving a pixel in a case of having a high level, and may be a gate-off-voltage in a case of having a low level. The output terminals OUT of the first through (n+1)-th stages SRC1-SRCn+1 output a high level period of a clock signal supplied to the first clock terminal CK1. For example, the output terminals OUT of the odd-numbered stages SRC1, SRC3, . . . , SRCn−1 output a high level period of the first clock signal CKV, and the output terminals OUT of the even-numbered stage SRC2, SRC4, . . . , SRCn output a high level period of the second clock signal CKVB. The carry terminals CR of the first through (n+1)-th stages SRC1-SRCn+1 output a carry signal based on the same clock signal as the clock signal output from the output terminal OUT.

The off-voltage line VSSL is connected to the off-voltage terminals VSS of the first through (n+1)-th stages SRC1-SRCn+1. The off-voltage line VSSL transmits an off-voltage VOFF. The control signal wiring unit CLS includes a first control line LS1 that receives a vertical start signal STV, a second control line LS2 that receives a first clock signal CKV, a third control line LS3 that receives a second clock signal CKVB.

The first control line LS1 is electrically connected to the input terminal IN of the first stage SRC1 and the control terminal CT of the dummy stage SRCn+1. The first control line LS1 transmits a vertical start signal STV. The second control line LS2 is connected to the first clock terminals CK1 of the odd-numbered stages SRC1, SRC3, . . . , SRCn−1 and the second clock terminals CK2 of the even-numbered stages SRC2, SRC4, . . . , SRCn. The second control line LS2 transmits a first clock signal CKV. The third control line LS3 is connected to the first clock terminals CK1 of the even-numbered stages SRC2, SRC4, . . . , SRCn and the second clock terminals CK2 of the odd-numbered stages SRC1, SRC3, . . . , SRCn−1. The third control line LS3 transmits a second clock signal CKVB.

Figure 6:
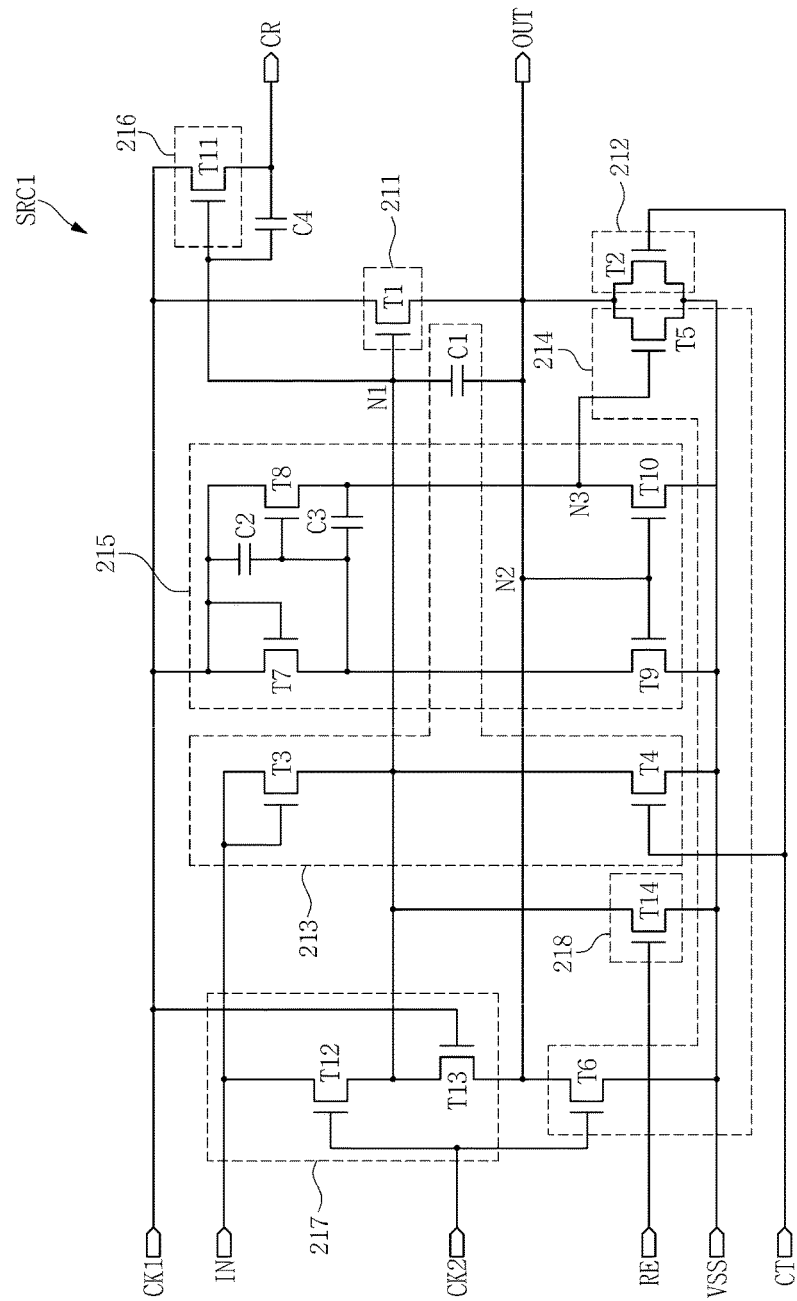
FIG. 6 is a circuit view of a first stage illustrated in FIG. 5.

FIG. 6 is a circuit view of the first stage SRC1 illustrated in FIG. 5. The second through (n+1)-th stages SRC2-SRCn+1 have the same configuration as that of the first stage SRC1. Accordingly, a circuit configuration of the first stage SRC1 will only be described hereinbelow, and a description pertaining to the configuration of the second through (n+1)-th stages SRC2-SRCn+1 will be omitted herein for conciseness.

The first stage SRC1, as illustrated in FIG. 6, includes a pull-up unit 211, a pull-down unit 212, a driving unit 213, a holding unit 214, a switching unit 215, and a carry unit 216. Hereinafter, gate signals output from the first through (n+1)-th stages SRC1-SRCn+1 will be defined as first through (n+1)-th gate signals.

The pull-up unit 211 pulls up a first clock signal CKV supplied through the first clock terminal CK1, and outputs the pulled-up first clock signal CKV through the output terminal OUT as a first gate signal. The pull-up unit 211 includes a first driving transistor T1 that is connected to a first node N1 through a gate electrode of the first driving transistor T1, connected to the first clock terminal CK1 through a drain electrode of the first driving transistor T1, and connected to the output terminal OUT through a source electrode of the first driving transistor T1.

The control terminal CT receives an input of a second gate signal that is output through the output terminal OUT of the second stage SRC2. Accordingly, the pull-down unit 212 pulls down the pulled-up first gate signal to a level of an off-voltage VOFF that is supplied through the off-voltage terminal VSS, in response to the second gate signal of the second stage SRC2. The pull-down unit 212 includes a second driving transistor T2 that is connected to the control terminal CT through a gate electrode of the second driving transistor T2, connected to the output terminal OUT through a drain electrode of the second driving transistor T2, and connected to the off-voltage terminal VSS through a source electrode of the second driving transistor T2.

The driving unit 213 turns on the pull-up unit 211 in response to a vertical start signal STV supplied through the input terminal IN, and turns off the pull-up unit 211 in response to the second gate signal from the second stage SRC2. For such turn-on and turn-off operations, the driving unit 213 includes a buffer unit, a charging unit, and a discharging unit.

The buffer unit includes a third driving transistor T3 that is connected to the input terminal IN through a gate electrode and a drain electrode of the third driving transistor T3 and connected to the first node N1 through a source electrode of the third driving transistor T3.

The charging unit includes a first capacitor C1 that is connected to the first node N1 through a first electrode of the first capacitor C1 and connected to a second node N2 through a second electrode of the first capacitor C1. The discharging unit includes a fourth driving transistor T4 that is connected to the control terminal CT through a gate electrode of the fourth driving transistor T4, connected to the first node N1 through a drain electrode of the fourth driving transistor T4, and connected to the off-voltage terminal VSS through a source electrode of the fourth driving transistor T4.

The third driving transistor T3 is turned on in response to the vertical start signal STV received through the input terminal IN. As a result, the vertical start signal STV is charged in the first capacitor C1. When an electric charge having a voltage level higher than that of a threshold voltage of the first driving transistor T1 is stored in the first capacitor C1, the first driving transistor T1 is turned on. The turned-on first driving transistor T1 outputs the first clock signal CKV that is input from the first clock terminal CK1 to the output terminal OUT.

A potential of the first node N1 may be bootstrapped by a variation in a potential of the second node N2 due to a coupling phenomenon of the first capacitor C1 caused by the variation in the potential of the second node N2. Accordingly, the first driving transistor T1 may output the first clock signal CKV applied to the drain electrode of the first driving transistor T1 to the output terminal OUT, substantially without a loss.

The first clock signal CKV output from the output terminal OUT is the first gate signal for driving the first gate line GL1. The vertical start signal STV charges the first driving transistor T1 as a preparation for generating the first gate signal. Subsequently, the fourth driving transistor T4 is turned on in response to the second gate signal of the second stage SRC2 that is input through the control terminal CT. When the fourth driving transistor T4 is turned on, the electric charge stored in the first capacitor C1 is discharged to the level of the off-voltage VOFF of the off-voltage terminal VSS.

The holding unit 214 includes fifth and sixth driving transistors T5 and T6 that maintain the first gate signal at the level of the off-voltage VOFF. The fifth driving transistor T5 includes a gate electrode connected to the third node N3, a drain electrode connected to the second node N2, and a source electrode connected to the off-voltage terminal VSS. The sixth driving transistor T6 includes a gate electrode connected to the second clock terminal CK2, a drain electrode connected to the second node N2, and a source electrode connected to the off-voltage terminal VSS.

The switching unit 215 includes seventh, eighth, ninth, and tenth driving transistors T7, T8, T9, and T10, and second and third capacitors C2 and C3, and controls driving operation of the holding unit 214. The seventh driving transistor T7 includes a gate electrode and a drain electrode connected to the first clock terminal CK1 and a source electrode connected to the third node N3 through the third capacitor C3. The eighth driving transistor T8 includes a drain electrode connected to the first clock terminal CK1, a gate electrode connected to the drain electrode of the eighth driving transistor T8 through the second capacitor C2, and a source electrode connected to the third node N3. In addition, the source electrode of the eighth driving transistor T8 is connected to the gate electrode of the eighth driving transistor T8 through the third capacitor C3. The ninth driving transistor T9 include a drain electrode connected to the source electrode of the seventh driving transistor T7, a gate electrode connected to the second node N2, and a source electrode connected to the off-voltage terminal VSS. The tenth driving transistor T10 includes a drain electrode connected to the third node N3, a gate electrode connected to the second node N2, and a source electrode connected to the off-voltage terminal VSS.

When a clock signal having a high level is output as a first gate signal through the output terminal OUT, a potential of the second node N2 rise to a high level. When the potential of the second node N2 rises to the high level, the ninth and tenth driving transistors T9 and T10 are turned on. In this instance, the seventh and eighth driving transistors T7 and T8 are turned on by the first clock signal CKV that is input to the first clock terminal CK1. The signals that output through the seventh and eighth driving transistors T7 and T8 are discharged to the level of the off-voltage VOFF through the ninth and tenth driving transistors T9 and T10. Accordingly, while the gate signal having the high level is output, a potential of the third node N3 are maintained at a low level. As a result, the fifth driving transistor T5 maintains a turned-off state.

Subsequently, the first gate signal is discharged through the off-voltage terminal VSS by the second gate signal of the second stage SRC2 that is input from the control terminal CT, and the potential of the second node N2 drops to a low level. Accordingly, the ninth and tenth driving transistors T9 and T10 are turned off, and the potential of the third node N3 may rise to a high level by the signal that is output from the seventh and eighth driving transistors T7 and T8. As the level of the potential of the third node N3 rises, the fifth driving transistor T5 are turned on, and the potential of the second node N2 is discharged to the level of the off-voltage VOFF through the fifth driving transistor T5.

In such a state, when the sixth driving transistor T6 is turned on by the second clock signal CKVB that is input to the second clock terminal CK2, the potential of the second node N2 is further discharged through the off-voltage terminal VSS. As a result, the fifth and sixth driving transistors T5 and T6 of the holding unit 214 maintain the potential of the second node N2 at the level of the off-voltage VOFF.

The switching unit 215 determines a turned-on point in time of the fifth driving transistor T5. The carry unit 216 includes an eleventh driving transistor T11. The eleventh driving transistor T11 is connected to the first clock terminal CK1 through a drain electrode of the eleventh driving transistor T11, connected to the first node N1 through a gate electrode of the eleventh driving transistor T11, and connected to the carry terminal CR through a source electrode of the eleventh driving transistor T11. When the potential of the first node N1 rises, the eleventh driving transistor T11 is turned on to output, to the carry terminal CR, the first clock signal CKV that is input to the drain electrode thereof.

The first stage SRC1 further includes a ripple prevention unit 217 and a reset unit 218. The ripple prevention unit 217 prevents the first gate signal maintained in a state of the off-voltage VOFF from being distorted by noise that is input through the input terminal IN. To this end, the ripple prevention unit 217 includes twelfth and thirteenth driving transistors T12 and T13. The twelfth driving transistor T12 includes a drain electrode connected to the input terminal IN, a gate electrode connected to the second clock terminal CK2, and a source electrode connected to the first node N1. The thirteenth driving transistor T13 includes a drain electrode connected to the first node N1, a gate electrode connected to the first clock terminal CK1, and a source electrode connected to the second node N2.

The reset unit 218 includes a fourteenth driving transistor T14. The fourteenth driving transistor T14 is connected to the first node N1 through a drain electrode of the fourteenth driving transistor T14, connected to the reset terminal RE through a gate electrode of the fourteenth driving transistor T14, and connected to the off-voltage terminal VSS through a source electrode of the fourteenth driving transistor T14.

The fourteenth driving transistor T14 discharges the first node N1 to the level of the off-voltage VOFF in response to an (n+1)-th gate signal of the (n+1)-th stage SRCn+1 that is input through the reset terminal RE. The output of the (n+1)-th gate signal from the (n+1)-th stage SRCn+1 indicates an end of a single frame. The reset unit 218 serves to discharge the first node N1 of the first through (n+1)-th stages SRC1-SRCn+1 at a point in time at which the single frame ends. In other words, the fourteenth driving transistor T14 of the reset unit 218 provided in each of the first through (n+1)-th stages SRC1-SRCn+1 is turned on by the output signal of the (n+1)-th stage SRCn+1. The turned-on fourteenth driving transistor T14 resets the first node N1 of each of the first through (n+1)-th stages SRC1-SRCn+1 to the state of the off-voltage VOFF. As a result, the first through (n+1)-th stages SRC1-SRCn+1 of the shift register 210 restart operation in an initialized state.

Figure 7:
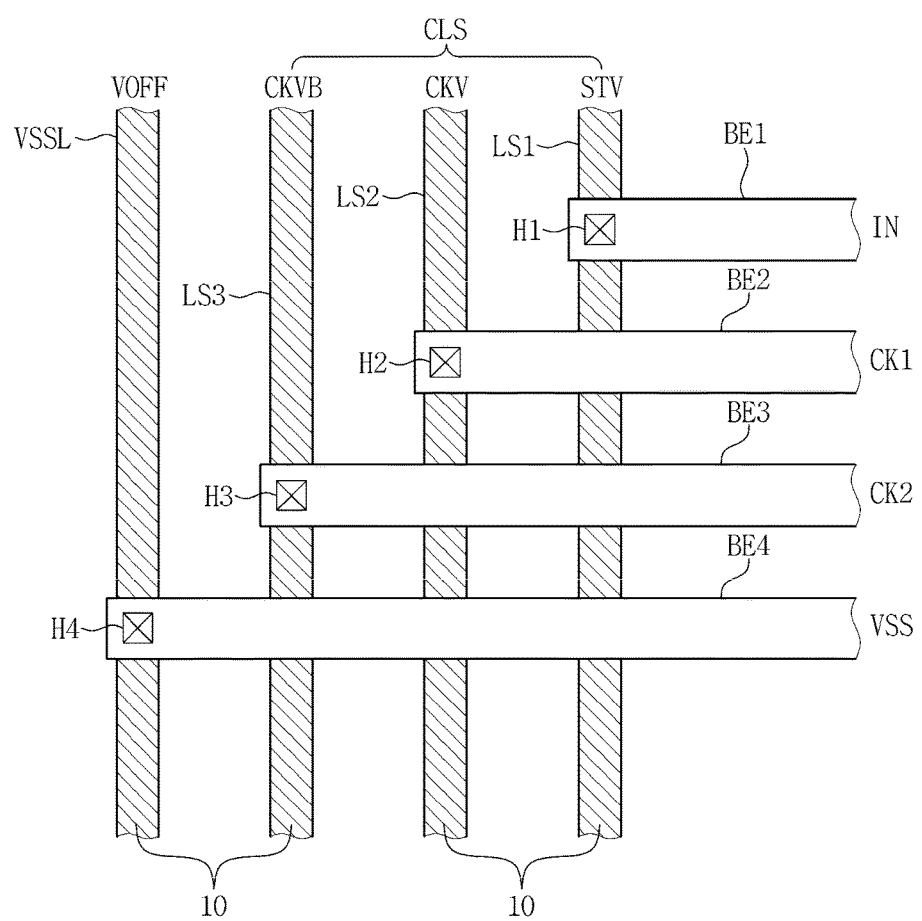
FIG. 7 is a plan view of first through third control lines and an off-voltage line illustrated in FIG. 6.
Figure 8:
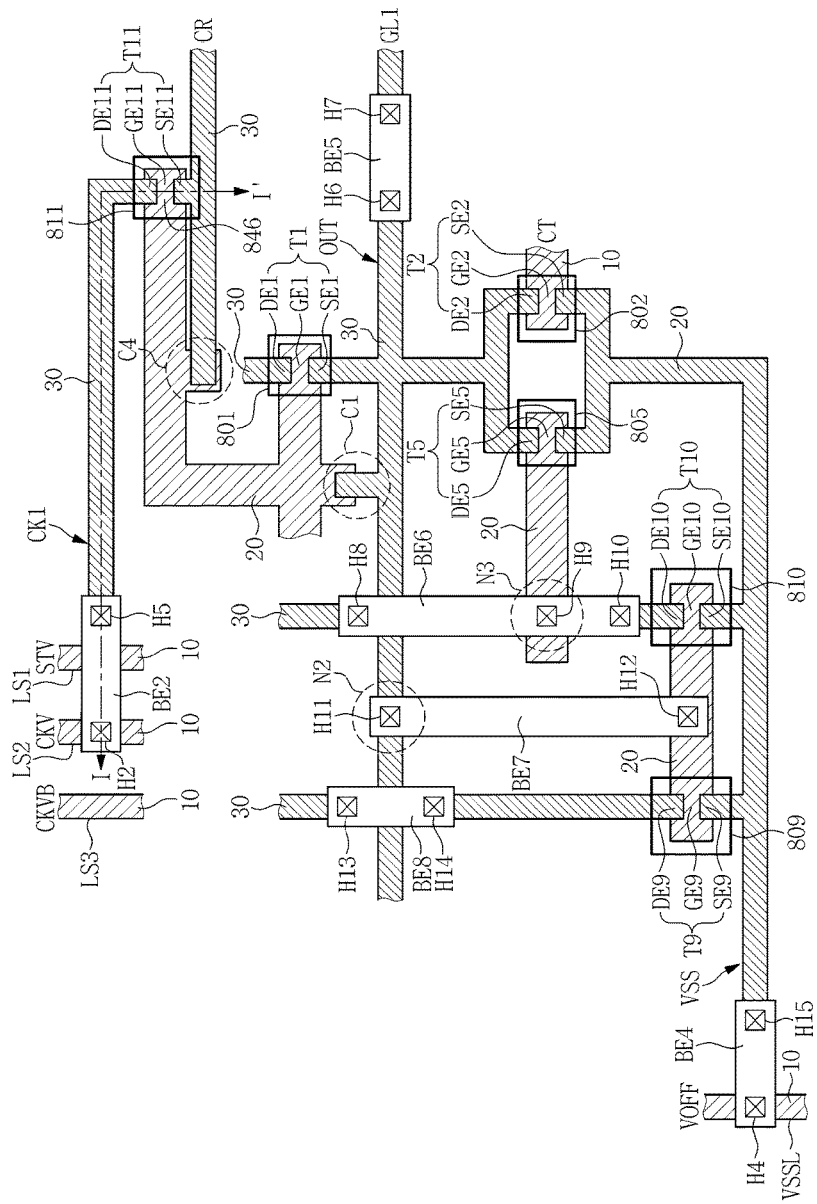
FIG. 8 is a plan view depicting a portion of a circuit of a first stage illustrated in FIG. 6.
Figure 9:
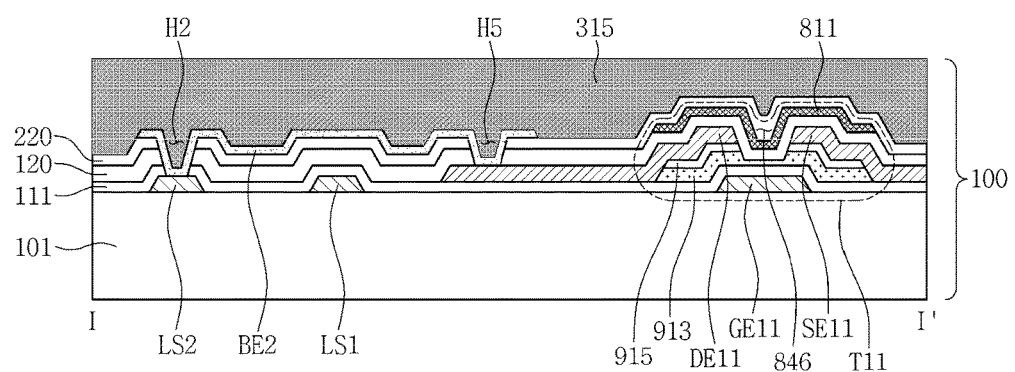
FIG. 9 is a cross-sectional view taken along line I-I' of FIG. 8.

FIG. 7 is a plan view of first through the third control lines LS1-LS3 and the off-voltage line VSSL illustrated in FIG. 6, FIG. 8 is a plan view depicting a portion of the circuit of the first stage SRC1 illustrated in FIG. 6, and FIG. 9 is a cross-sectional view taken along line I-I' of FIG. 8.

FIG. 8 illustrates the first, second, fifth, ninth, tenth, and eleventh driving transistors T1, T2, T5, T9, T10, and T11 as a portion of the first stage SRC1. FIG. 8 substantially illustrates a portion of a predetermined stage provided in the gate driving unit 266. Transistors not illustrated in FIG. 8 may be clearly inferred from the plan view of FIG. 8.

As illustrated in FIGS. 7 to 9, a first conductive pattern 10 includes the first through third control lines LS1-LS3 and the off-voltage line VSSL. The first conductive pattern 10 is disposed on the non-display unit 105b of the lower substrate 101. The first conductive pattern 10 is formed of the same material as that forming the aforementioned gate line GL. In addition, the first conductive pattern 10 may be disposed on the same layer as a layer on which the gate line GL is disposed.

A second conductive pattern 20 includes gate electrodes GE1, GE2, GE5, GE9, GE10, and GE11 of the first, second, fifth, ninth, tenth, and eleventh driving transistors T1, T2, T5, T9, T10, and T11. The second conductive pattern 20 is disposed on the non-display unit 105b of the lower substrate 101. The second conductive pattern 20 may be formed of the same material as that forming the aforementioned gate line GL. In addition, the second conductive pattern 20 may be disposed on the same layer as a layer on which the gate line GL is disposed.

A third conductive pattern 30 includes source electrodes SE1, SE2, SE5, SE9, SE10, and SE11 of the first, second, fifth, ninth, tenth, and eleventh driving transistors T1, T2, T5, T9, T10, and T11, drain electrodes DE1, DE2, DE5, DE9, DE10, and DE11 of the first, second, fifth, ninth, tenth, and eleventh driving transistors T1, T2, T5, T9, T10, and T11, and an output terminal OUT. The third conductive pattern 30 is disposed in the non-display unit 105b of the lower substrate 101. In detail, the third conductive pattern 30 is disposed on the gate insulating layer 111 of the non-display unit 105b.

The third conductive pattern 30 may be formed of the same material as that forming the aforementioned data line DL. In addition, the third conductive pattern 30 may be disposed on the same layer as a layer on which the data line DL is disposed.

The first through third control lines LS1-LS3 and the off-voltage line VSSL are connected to the driving transistors by a bridge electrode. For example, the second control line LS2 is connected to a second bridge electrode BE2 through a second contact hole H2. The drain electrode D11 of the eleventh driving transistor T11 is connected to the second bridge electrode BE2 through a fifth contact hole H5. Accordingly, the second control line LS2 is connected to the eleventh driving transistor T11.

The gate electrode, source electrode, and drain electrode may be connected by the bridge electrode. For example, the gate electrode GE5 of the fifth driving transistor T5, as illustrated in FIG. 6, is connected to the drain electrode DE10 of the tenth driving transistor T10. In this case, as illustrated in FIG. 8, the gate electrode GE5 of the fifth driving transistor T5 is connected to a sixth bridge electrode BE6 through a ninth contact hole H9, and the drain electrode DE10 of the tenth driving transistor T10 is connected to the sixth bridge electrode BE6 through a tenth contact hole H10.

The bridge electrodes BE1-BE8 may be formed simultaneously with the pixel electrode 114 illustrated in FIGS. 2 and 3. The bridge electrodes BE1-BE8 may be formed of the same material as that forming the pixel electrode 114. In addition, the bridge electrodes BE1-BE8 may be disposed on the same layer as a layer on which the pixel electrode 114 is disposed.

The second conductive patterns 20 and the third conductive patterns 30 are connected to one another by the bridge electrode. The third conductive patterns 30 are connected to one another by the bridge electrode. For example, the gate electrodes GE9 and GE10 of the ninth and tenth driving transistors T9 and T10 and the output terminal OUT, as illustrated in FIG. 8, are connected to the second node N2. In this case, the gate electrodes GE9 and GE10 of the ninth and tenth driving transistors T9 and T10 are connected to the seventh bridge electrode BE7 through a twelfth contact hole H12. The output terminal OUT is connected to the seventh bridge electrode BE7 through an eleventh contact hole H11.

The drain electrode DE9 of the ninth driving transistor T9, as illustrated in FIG. 6, is connected to the source electrode SE7 of the seventh driving transistor T7 and is not connected to a signal line of the output terminal OUT. In this case, the drain electrode DE9 of the ninth driving transistor T9 is connected to the eighth bridge electrode BE8 through a fourteenth contact hole H14. The third conductive pattern 30 forming the source electrode SE7 of the seventh driving transistor T7 is connected to the eighth bridge electrode BE8 through a thirteenth contact hole H13.

The first capacitor C1 is formed in an area in which the gate electrode GE1 of the first driving transistor T1 and the source electrode SE1 of the first driving transistor T1 overlap one another. The output terminal OUT is connected to the fifth bridge electrode BE5 through the sixth contact hole H6. The first gate line GL1 is connected to the fifth bridge electrode BE5 through the seventh contact hole H7. Accordingly, the output terminal OUT is connected to the first gate line GL1.

As illustrated in FIG. 8, a shielding layer is disposed on at least one of the driving transistors provided in the gate driving unit 266. For example, as illustrated in FIG. 8, first, second, fifth, ninth, tenth, and eleventh shielding layers 801, 802, 805, 809, 810, and 811 are disposed on the first, second, fifth, ninth, tenth, and eleventh driving transistors T1, T2, T5, T9, T10, and T11. In this instance, the first, second, fifth, ninth, tenth, and eleventh shielding layers 801, 802, 805, 809, 810, and 811 are separated from one another.

The first, second, fifth, ninth, tenth, and eleventh shielding layers 801, 802, 805, 809, 810, and 811 are disposed on the first protection layer 120. The first, second, fifth, ninth, tenth, and eleventh shielding layers 801, 802, 805, 809, 810, and 811 may be in direct contact with the first protection layer 120. In this instance, the first, second, fifth, ninth, tenth, and eleventh shielding layers 801, 802, 805, 809, 810, and 811 overlap the first, second, fifth, ninth, tenth, and eleventh driving transistors T1, T2, T5, T9, T10, and T11, while being on the first protection layer 120. In one embodiment, the first shielding layer 801 may overlap a channel 846 of the first driving transistor T1. In this instance, the first shielding layer 801 may have a size greater than or equal to that of the channel 846. For example, the first shielding layer 801 may have a surface area greater than or equal to that of the channel 846. In another embodiment, the first shielding layer 801 may have a size greater than or equal to that of the semiconductor layer 113. For example, the first shielding layer 801 may have a surface area greater than or equal to that of the semiconductor layer 113. The remaining second, fifth, ninth, tenth, and eleventh shielding layers 802, 805, 809, 810, and 811 may also have the same structure as that of the first shielding layer 801.

The shielding layer may be disposed on the third, fourth, sixth, seventh, eighth, twelfth, thirteenth, and fourteenth driving transistors T3, T4, T6, T7, T8, T12, T13, and T14, which are not illustrated. In other words, the shielding layer may be disposed on each of the driving transistors T1-T14 provided in the gate driving unit 266.

The shielding layer of the gate driving unit 266 may be formed of the same material as that forming the aforementioned shielding layer 435 of FIG. 3. In addition, the shielding layer of the gate driving unit 266 may be disposed on the same layer as a layer on which the shielding layer (e.g., the shielding layer 435 of FIG. 3) is disposed. Further, the shielding layer of the gate driving unit 266 and the common electrode 130 may be simultaneously formed in the same mask process. In this instance, as illustrated in FIG. 8, the shielding layer of the gate driving unit 266 and the common electrode 130 are not connected to each other. Moreover, when a plurality of shielding layers are disposed in the gate driving unit 266, the plurality of shielding layers may not be connected to one another.

The shielding layer of the gate driving unit 266 may be maintained in an electrically floating state. In other words, any electric signal applied to the shielding layer of the gate driving unit 266 may be absent. The shielding layer of the gate driving unit 266 may serve to prevent hydrogen which is generated from the second protection layer 220 from flowing into the channel of the first through fourteenth driving transistors T1-T14. The common electrode 130, the shielding layer 435 of the display unit 105a, and the shielding layer of the gate driving unit 266 disposed in the non-display unit 105b may be simultaneously formed in the same mask process.

As set forth above, according to one or more exemplary embodiments, the thickness of the display panel may be reduced due to the absence of the organic layer between the first and second protection layers. In addition, due to the shielding layer being disposed between the first and second protection layers to overlap the pixel transistor and the driving transistor, the infiltration of moisture from the second protection layer into the pixel transistor and the driving transistor may be prevented. Further, since the shielding layers are separated from one another, the coupling phenomenon between the shielding layers and the layers disposed therebelow may be significantly reduced.

From the foregoing, it will be appreciated that various embodiments in accordance with the present disclosure have been described herein for purposes of illustration, and that various modifications may be made without departing from the scope and spirit of the present disclosure. Accordingly, the various embodiments disclosed herein are not intended to be limiting of the scope and spirit of the present disclosure. Various features of the above described and other embodiments can be mixed and matched in any manner, to produce further embodiments consistent with the present disclosure.

What is claimed is:

1. A liquid crystal display device comprising:
   a lower substrate including a display unit and a non-display unit;
   an upper substrate opposing the lower substrate;
   a liquid crystal layer interposed between the lower substrate and the upper substrate;
   a gate line and a data line disposed in the display unit of the lower substrate;
   a light shielding layer defining a pixel region of the lower substrate;
   a pixel electrode disposed in the pixel region of the lower substrate;
   a pixel transistor disposed in the display unit of the lower substrate and connected to the gate line, the data line, and the pixel electrode;
   a driving transistor disposed in the non-display unit of the lower substrate;
   a first protection layer disposed on the pixel transistor and the driving transistor;
   a shielding layer disposed on the first protection layer, the shielding layer overlapping at least one of the pixel transistor and the driving transistor and in an electrically floating state;
   a second protection layer disposed on the shielding layer; and
   a common electrode interposed between the first protection layer and the second protection layer to overlap the pixel electrode,
   wherein any electric signal applied to the shielding layer is absent, and
   wherein the common electrode completely surrounds the shielding layer in a plan view.

2. The liquid crystal display device of claim 1, wherein the shielding layer overlaps a channel of one of the pixel transistor and the driving transistor.

3. The liquid crystal display device of claim 2, wherein the shielding layer has a greater size than a size of the channel of one of the pixel transistor and the driving transistor.

4. The liquid crystal display device of claim 2, wherein the shielding layer has a greater size than a size of a semiconductor layer of one of the pixel transistor and the driving transistor.

5. The liquid crystal display device of claim 1, wherein the shielding layer includes a first shielding layer overlapping a channel of the pixel transistor and a second shielding layer overlapping a channel of the driving transistor.

6. The liquid crystal display device of claim 5, wherein the first shielding layer has a greater size than a size of the channel of the pixel transistor.

7. The liquid crystal display device of claim 5, wherein the first shielding layer has a greater size than a size of a semiconductor layer of the pixel transistor.

8. The liquid crystal display device of claim 5, wherein the second shielding layer has a greater size than a size of the channel of the driving transistor.

9. The liquid crystal display device of claim 5, wherein the second shielding layer has a greater size than a size of a semiconductor layer of the driving transistor.

10. The liquid crystal display device of claim 5, wherein the first shielding layer is separated from the second shielding layer.

11. The liquid crystal display device of claim 1, wherein the shielding layer is in direct contact with the first protection layer.

12. The liquid crystal display device of claim 1, wherein the first protection layer and the second protection layer are formed of an inorganic insulating material.

13. The liquid crystal display device of claim 1, wherein the common electrode is disposed on a same layer as a layer on which the shielding layer is disposed.

14. The liquid crystal display device of claim 1, further comprising a color filter interposed between the first protection layer and the common electrode to overlap the pixel electrode.

15. The liquid crystal display device of claim 1, further comprising a color filter disposed on the upper substrate to overlap the pixel electrode.

16. The liquid crystal display device of claim 1, wherein the light shielding layer is disposed on the second protection layer and covers an entire surface of the lower substrate, aside from the pixel region.

17. The liquid crystal display device of claim 1, wherein the light shielding layer is disposed on an entire surface of the upper substrate, aside from the pixel region.

18. The liquid crystal display device of claim 1, wherein the pixel electrode includes:
   a stem electrode; and
   a plurality of branch electrodes branching off from the stem electrode.

19. The liquid crystal display device of claim 18, further comprising a connection electrode extending from the stem electrode to outwardly of the pixel region and connected to the pixel transistor.

20. The liquid crystal display device of claim 1, further comprising a column spacer between the lower substrate and the upper substrate, wherein the shielding layer overlapping the pixel transistor is disposed between the pixel transistor and the column spacer.

21. The liquid crystal display device of claim 1, wherein the shielding layer has a groove at a channel region of the at least one of the pixel transistor and the driving transistor.

* * * * *